(12) United States Patent
Kim

(10) Patent No.: US 9,513,433 B2
(45) Date of Patent: Dec. 6, 2016

(54) APPARATUS FOR GENERATING LONG-PERIOD GRATINGS IN OPTICAL FIBER

(71) Applicant: KS Photonics Inc., Daejeon (KR)

(72) Inventor: Young Kie Kim, Daejeon (KR)

(73) Assignee: KS PHOTONICS INC., Daejeon (KR)

( * ) Notice: Subject to any disclaimer, the term of this patent is extended or adjusted under 35 U.S.C. 154(b) by 51 days.

(21) Appl. No.: 14/583,966

(22) Filed: Dec. 29, 2014

(65) Prior Publication Data

US 2016/0185059 A1 Jun. 30, 2016

(51) Int. Cl.
*G02B 6/02* (2006.01)

(52) U.S. Cl.
CPC ....... *G02B 6/02195* (2013.01); *G02B 6/02071* (2013.01); *G02B 6/02095* (2013.01)

(58) Field of Classification Search
CPC ............ G02B 6/02071; G02B 6/02095; G02B 6/02195
See application file for complete search history.

(56) References Cited

U.S. PATENT DOCUMENTS 6,498,877 B1 12/2002 Chowdhury et al.
6,628,861 B1 * 9/2003 Yao .................... G02B 6/02071
385/24

FOREIGN PATENT DOCUMENTS

KR 10-0274075 12/1999

OTHER PUBLICATIONS

Yokouchi et al., "Thermal Tuning of mechanically induced long-period fiber grating", Applied Optics vol. 44, No. 24, Aug. 2005, pp. 5024-5028.*
Sakata et al., "Tunable bandpass filter based on force-induced long-period fiber grating in double cladding fiber", Optics Letters vol. 35, No. 7, Apr. 1, 2010, pp. 1061-1063.*
Newport, "Motorized Linear Stage Guide", website—www.newport.com/Motorized-Linear-Translation-Stage-Selection-Guide/168479/1033/content.aspx, published Dec. 9, 2013 per Internet Archive Wayback Machine.*
Julian M. Estudillo-Ayala et al. "Long Period Fiber Grating Produced by Arc Discharges", Fiber Optic Sensors, Feb. 2012, pp. 295-317, www.intechopen.com.
In Kag Hwang et al., "Long-period fiber gratings based on periodic microbends", Department of Physics, Korea Advanced Institute of Science and Technology, Optics Letters, Sep. 15, 1999, vol. 24, No. 18, pp. 1263-1265.

* cited by examiner

*Primary Examiner* — Lisa Herring
(74) *Attorney, Agent, or Firm* — Kile Park Reed & Houtteman PLLC

(57) ABSTRACT

An apparatus for generating long-period gratings in an optical fiber is disclosed herein. The apparatus includes an intensity adjusting unit and a period adjusting unit that come into contact with a portion of an optical fiber where gratings will be generated. The intensity adjusting unit includes a press part configured to press the portion of the optical fiber where gratings will be generated against a grating generating unit, and an intensity adjusting mechanism configured to apply force to the press part. The period adjusting unit includes a period adjusting mechanism configured to selectively increase and decrease the length of the grating generating unit.

16 Claims, 7 Drawing Sheets

APPARATUS FOR GENERATING LONG-PERIOD GRATINGS IN OPTICAL FIBER

BACKGROUND

1. Technical Field

The present invention relates to an apparatus for generating long-period gratings in an optical fiber. More particularly, the present invention relates to an apparatus for generating the various periods of long-period gratings in a given arbitrary multi-mode optical fiber to couple two modes of various natural modes that can be present in the optical fiber.

2. Description of the Related Art

An optical fiber guides light based on the principle of total reflection attributable to the difference between the refractive indices of a core and a cladding. In this case, electric fields inside an optical fiber in a cross-sectional direction are present in a segmented form in a way that satisfies boundary conditions between a core, a cladding, and the outside of the optical fiber. These are referred to as optical fiber modes. Arbitrary light present in an optical fiber can be expressed by the linear coupling of the modes.

FIG. 1 illustrates the types of optical fiber modes that are linearly polarized. Optical fiber modes are classified as a mode (an $LP_{0m}$) having no electric field node in an azimuthal direction and a mode (an $LP_{lm}$ mode; $l>0$) having an electric field node in an azimuthal direction. The $LP_{0m}$ mode is a symmetric mode, and the $LP_{lm}$ mode is an asymmetric mode.

The number of modes that can be present in an optical fiber may vary depending on parameters, such as the wavelength of propagating light, the difference between the refractive indices of a core and a cladding, and the size of the core. An optical fiber having a single optical fiber mode that can be present is referred to as a single-mode optical fiber at a predetermined wavelength, whereas an optical fiber having two or more modes that can be present is referred to as a few-mode optical fiber. Even the same optical fiber may have a different number of modes when a wavelength used in an optical fiber varies.

As is known to those skilled in the art, the propagation constant $\beta_{lm}$ in the $LP_{lm}$ mode is defined as $2\pi n_{eff}/\lambda$, where $\lambda$ is the wavelength and $n_{eff}$ is the effective refractive index.

Each of the modes undergoes a phase change corresponding to a value obtained by multiplying the propagation constant of the mode by the propagation length thereof while propagating though an optical fiber. On the assumption that two different modes A and B propagate through an optical fiber, the relative phase difference between the two modes is periodically repeated from 0 to $2\pi$, and the length over which a relative phase of modes is changed by $2\pi$ and returns to an original phase difference is referred to as a beat length $L_B$. The beat length $L_B$ is calculated as follows:

$$L_B = (2\pi)/(\beta_A - \beta_B)$$

Meanwhile, examples of gratings generated in an optical fiber include, for example, Bragg gratings and long-period gratings. In Bragg gratings, when light having a wide bandwidth propagates through an optical fiber, the light is located at the center of a Bragg wavelength, a signal in a narrow bandwidth is reflected, and a signal in a band from which a Bragg wavelength has been removed is transmitted.

Long-period optical fiber gratings having a period ranging from 100 to 1000 μm (1 mm) are obtained by applying a periodic perturbation to the refractive index of a given optical fiber. Methods of applying a perturbation include mechanical minute bending, minute bending via sonic waves, a change in refractive index via an electric arc, and a change in refractive index via UV light.

The generation of gratings in an optical fiber is disclosed in the following documents.

U.S. Pat. No. 6,498,877 discloses a tunable optical fiber including gratings applied to at least a portion of a core. Tunability depends on an outermost layer which is applied to the outer layer of a cladding and whose refractive index is varied by a manipulation mechanism. That is, when the refractive index of the outermost layer is changed, the propagation constant of a cladding mode is also changed due to a change in the boundary condition, and the propagation constant of a core mode is also changed according to the distance from the boundary surface between the core and the cladding to the outermost layer.

Korean Patent No. 10-0274075 discloses a method of selectively converting the core mode of light, propagating through an optical fiber, into a cladding mode depending upon the wavelength of light using an elastic wave generator capable of varying the amplitude and wavelength of elastic waves through the control of the frequency and amplitude of an input electrical signal.

The paper of Estudillo-Ayala et al. discloses the principle of long-period fiber gratings, a production method using arc discharge, modulation using refractive indices, periodical modulation using minute taper or minute bending, the application fields of long-period fiber gratings, and a sensor (see Long Period Fiber Grating Produced by Arc Discharges, Julian M. Estudillo-Ayala et al., Universidad de Guanajuato, pp. 295-316, www.intechopen.com).

The paper of Hwang discloses a technology for linearly and tightly maintaining an optical fiber between two fiber holders, moving one of the fiber holders in a direction perpendicular to the axis of the optical fiber, for example, at intervals of 100 μm to thus generate lateral stress, and deforming a fiber by applying an electric arc to thus impart minute bends at regular intervals, preferably intervals of less than 1 μm (see Long-period fiber gratings based on periodic microbends, In Kag Hwang et al., Department of Physics, Korea advanced Institute of Science and Technology, Sep. 15, 1999/Vol. 24, No. 18/OPTICAL LETTERS pp. 1263-1265).

However, the above-described conventional technologies disclosed in the above documents have a limitation in that, when a pair of modes that will be coupled to each other are determined in an optical fiber and gratings are applied, this cannot be changed.

Accordingly, there is a need for an apparatus that is capable of overcoming the above problem, achieving the conversion between modes with minimum loss at the same time, and adjusting the interval and intensity of long-period gratings applied to an optical fiber.

First, the mode coupling theory is described as a background theory for long-period optical fiber gratings, as follows.

A Maxwell equation that should be satisfied by electric fields in an optical fiber in which an arbitrary perturbation has been applied to the refractive index of the core of the optical fiber is given as follows:

$$\nabla^2 E(x, y, z) + \frac{\omega^2}{c^2} \{n^2 + 2n\Delta n(x, y, z)\} E(x, y, z) = 0$$

where Δn(x, y, z) is a function that describes the perturbation of the refractive index.

Electric fields in an optical fiber system having a perturbation in refractive index can be expressed by the linear coupling of ideal step index optical fiber modes having no perturbation, that is, modes in which the refractive index changes from a core to a cladding in a stepped manner, as follows:

$$E(x, y, z) = \sum_{k=-\infty}^{\infty} A_k(z) F_k(x, y) \exp(i\beta_k z)$$

where z is the propagation direction of an optical fiber mode, $A_k(z)$ is a intensity function according to the propagation direction of a k-mode, $F_k(x, y)$ is a k-mode function in an ideal step index optical fiber having no perturbation, and $\beta_k$ is the propagation constant of the k-mode.

The following results are obtained by considering $A_k(z)$ of the above equation to be a constant in the case of a propagation length of about one wavelength, adding a condition that the orthogonality of the mode $F_k(x, y)$ and the perturbation of the refractive index are sinusoidal, and then substituting the condition into the Maxwell equation. The above condition is a condition that can be applied to the apparatus according to the present invention.

$$\frac{\partial A_s}{\partial z} = \sum_{k=-\infty}^{\infty} iO_k^s(x, y) A_k(z) \exp i\left(\beta_k - \beta_s - \frac{2\pi}{\Lambda}\right)z$$

$$iO_k^s(x, y) = \frac{2n\omega^2}{c^2 2\beta_s} \int\int_{-\infty}^{\infty} \Delta n(x, y) F_k F_s^* dx dy$$

The following simultaneous differential equations are obtained by considering only two modes again.

$$\frac{\partial A_a}{\partial z} = iO_b^a A_b \exp i\left(\beta_a - \beta_b - \frac{2\pi}{\Lambda}\right)z$$

$$\frac{\partial A_b}{\partial z} = iO_a^b A_a \exp i\left(\beta_b - \beta_a - \frac{2\pi}{\Lambda}\right)z$$

where $O_b^a$ is simply expressed as O and is the coupling intensity constant between modes a and b, $O_b^a$ is the conjugate complex number of $O_b^a$, and Λ is a perturbation period.

Finally, the intensity at which the initial mode a is coupled to the mode b can be expressed by the following Equation 1 by solving the simultaneous differential equations:

$$\frac{|o|^2}{|o|^2 + (\Delta\beta/2)^2} \sin^2\left[\sqrt{|o|^2 + (\Delta\beta/2)^2}\right] \quad (1)$$

where $$\Delta\beta = \beta_a - \beta_b - \frac{2\pi}{\Lambda}$$

represents non-phase matching, and o is the mode coupling constant.

The result of Equation 1 determines factors that should be considered in long period optical fiber gratings for the coupling of modes.

Although various methods of generating gratings in a long-period optical fiber are present, the present invention employs a method of applying minute bending by mechanically pressing an optical fiber. When minute bending is applied to an optical fiber, the partial stress attributable to the curvature of the optical fiber generates a perturbation Δn(x, y) in refractive index that is asymmetrical with respect to the x-y direction in the core portion of the optical fiber.

Furthermore, in order to achieve a 100% coupling from one mode to another mode, the non-phase matching Δβ should be zero. This can be achieved when the period of applied gratings completely coincides with the beat length of two modes that will be coupled to each other.

Referring to Equation 1, the coupling of modes can be achieved only when the mode coupling intensity constant is not zero. Since the perturbation in refractive index generated in a minute bending manner is asymmetrical with respect to the x-y direction, the coupling between a symmetrical mode and an asymmetrical mode can be achieved. If the two modes that will be coupled to each other are a symmetric mode and an asymmetric mode, the coupling intensity constant can be adjusted through the intensity of mechanical pressure that is used to generate minute bending.

SUMMARY

Accordingly, the present invention is intended to the provision of an apparatus for generating adjustable long-period gratings, in which (A) long-period gratings are applied with minimum damage to an optical fiber, (B) the conversion between modes can be achieved with minimum loss of light that propagates through the optical fiber, (C) the intervals between long-period gratings applied to the optical fiber can be freely adjusted, and (D) the intensity of long-period gratings applied to the optical fiber can be adjusted.

In accordance with an aspect of the present invention, there is provided an apparatus for generating long-period gratings in an optical fiber, the apparatus including an intensity adjusting unit configured to adjust the radius of curvature of gratings generated in an optical fiber; and a period adjusting unit configured to adjust the period of the gratings generated in the optical fiber.

The period adjusting unit may include a grating generating unit configured to generate the gratings in the optical fiber; and a period adjusting mechanism configured to selectively increase and decrease the length of the grating generating unit.

The period adjusting mechanism may include a period adjusting knob configured to rotatable; a pair of driven gears operatively connected to the period adjusting knob, and configured to be rotated in opposite directions; and a grating period determination unit connected to the opposite ends of the grating generating unit, and configured such that the location of the grating period determination unit is changed through the rotation of the pair of driven gears to change the length of the grating generating unit.

The period adjusting mechanism may further include a pair of driving gears installed on a shift connected to the period adjusting knob in order to operatively connect the pair of driven gears rotated in opposite directions in the period adjusting mechanism, and one of the pair of driving gears may be engaged with one of the pair of driven gears and the other driving gear may be operatively connected to the other driven gear via an auxiliary gear.

The period adjusting mechanism may include a period adjusting controller; a power generating unit configured to provide power for changing the length of the grating generating unit under the control of the period adjusting controller; and a grating period determination unit connected to at least one end of the grating generating unit, and configured to change the length of the grating generating unit by varying the location of the grating period determination unit using the power generating unit.

One end of the grating period determination unit may be fixed and the location of an opposite end of the grating period determination unit may be changed by the driven gears, thereby changing the length of the grating generating unit, and the driven gears may be operatively connected to the period adjusting knob.

The grating generating unit may be a spring.

The intensity adjusting unit may include an intensity adjusting mechanism; an extension member configured to extend from the intensity adjusting mechanism; a holder configured to accommodate the extension member and change a linear location of the extension member as the extension member rotates; and a press part coupled to the holder, and configured to press the optical fiber along with the grating generating unit by changing the linear location thereof.

The press part may be a plate spring or acryl.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
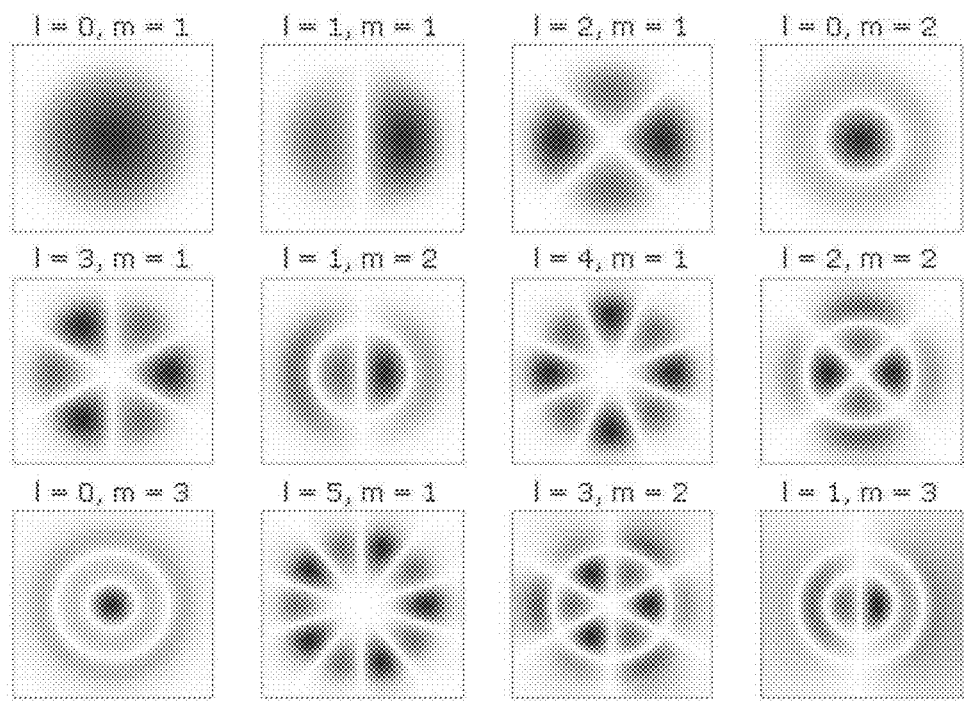
FIG. 1 is a diagram illustrating the modes of a linearly polarized optical fiber.
Figure 2:
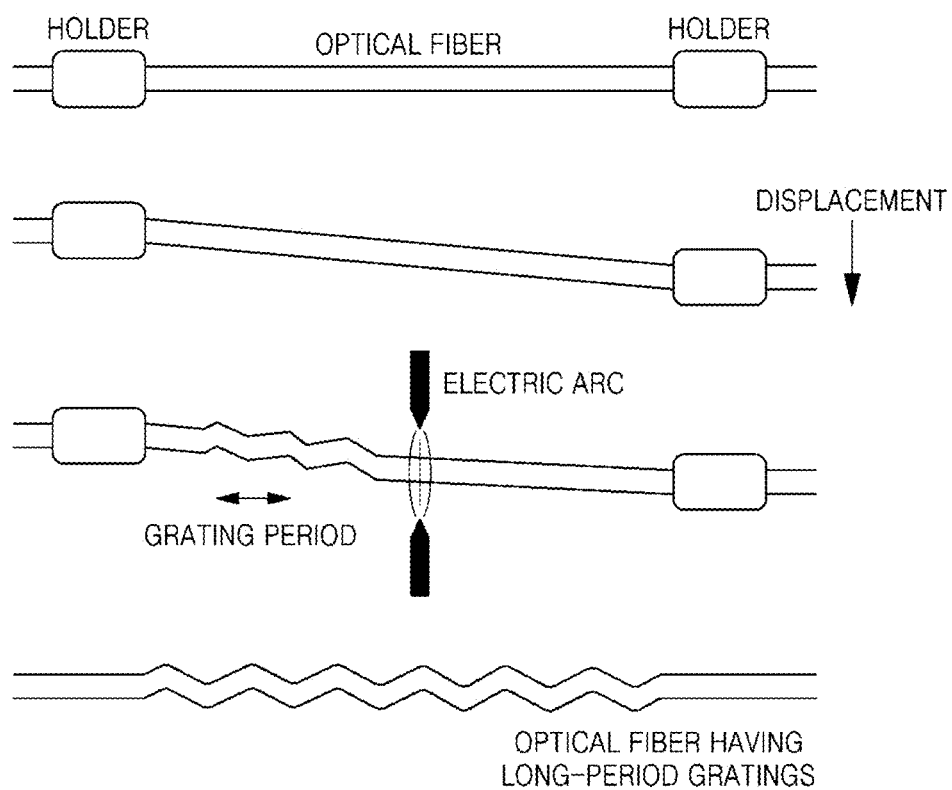
FIG. 2 is a diagram illustrating a process of generating a minute bend by applying an electric arc.
Figure 3:
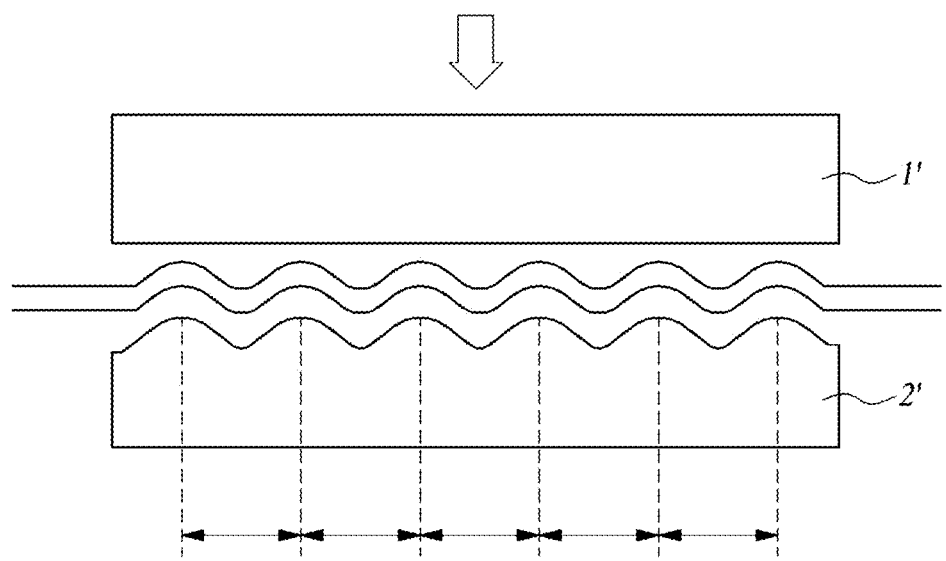
FIG. 3 is a conceptual diagram illustrating the principle of the present invention.

As illustrated in FIG. 3, the principle of the present invention is to locate an optical fiber between an optical fiber press plate 1' and an optical fiber support plate 2' having minute bending inducing depressions and protrusions, control the pressing force of the optical fiber press plate 1' and vary the intervals of the depressions and protrusions in the directions of arrows.

The press plate 1' requires optimum design for the location, area, and press method thereof in order to prevent damage to the optical fiber and achieve optimum coupling efficiency. The control of the force of the press plate theoretically functions to adjust the mode coupling intensity constant O in Equation 1. The intensity or strength of the gratings may be adjusted by controlling the force of the press plate. The variation of the intervals of the depressions and protrusions theoretically functions to adjust the perturbation period $\Lambda$ in Equation 1.

The present invention is based on the principle of adjusting the mode coupling intensity constant and the perturbation period.

An exemplary embodiment of the present invention will be described in detail below with reference to the accompanying drawings.

Figure 4:
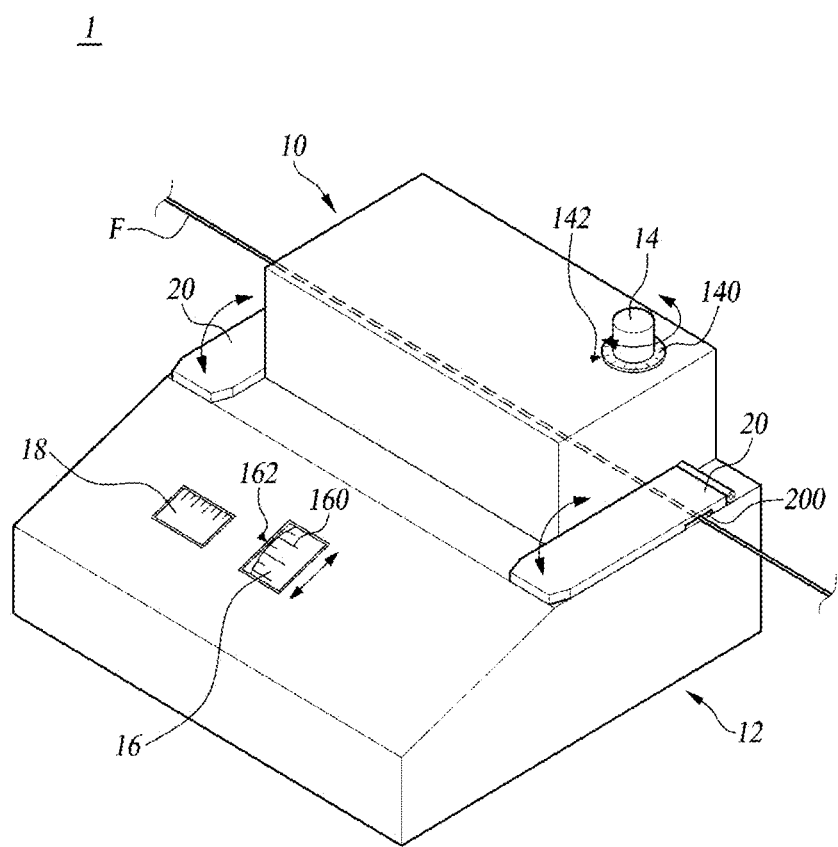
FIG. 4 is a perspective view illustrating the external appearance of an apparatus for generating long-period gratings according to an embodiment of the present invention.

FIG. 4 illustrates a perspective view of the external appearance of an apparatus 1 applied to an optical fiber having long-period gratings according to the present invention. The apparatus 1 according to the present invention includes an upper frame 10 configured to have a rectangular shape, and a lower frame 12 configured to have a rectangular shape, to support the upper frame 10 and to be inclined upward such that a wider space can be provided on the rear side of the lower frame 12. As will be described below, an intensity adjusting unit 2 configured to adjust mode coupling intensity is disposed in the upper frame 10, and a period adjusting unit 3 configured to adjust perturbation period is disposed in the lower frame 12. Although the upper frame 10 may be integrated with the lower frame 12, it is preferable that the upper frame 10 is detachably coupled to the lower frame 12 in an assembled manner.

A dial-type intensity adjusting knob 14 forming part of the intensity adjusting unit 2 protrudes from the upper surface of the upper frame so that it can be rotated leftward and rightward along the directions of arrows. A disk 140 having a large radius is integrated with the lower surface of the intensity adjusting knob 14, and preferably, 100 equal graduations are densely marked on the disk 140 at the same interval. The interval of the graduations is, for example, 10 μm. The origin of the graduations is adjusted to a reference line 142. Accordingly, an operator may rotate the intensity adjusting knob 14 to adjust pressing force applied to an optical fiber, for example, by adjusting the radius of curvature in units of 10 μm.

The dial-type period adjusting knob 16 forming part of the period adjusting unit 3 is inserted into the front surface of the lower frame 12 so that the dial-type period adjusting knob 16 can be rotated upward and downward in the directions of the arrows. A graduation part 160 having the same cylindrical shape is formed on the left side of the period adjusting knob 16 in an integrated manner and, preferably, 60 equal graduations are densely marked on the graduation part 160 at the same interval. The interval of the graduations is, for example, 10 μm. The origin of the graduations is adjusted to a reference line 162. Accordingly, an operator may rotate the period adjusting knob 16 to adjust the interval of gratings applied to the optical fiber, that is, period, for example, in units of 10 μm.

A display unit 18 displays the calculated interval of the gratings. The display unit 18 may employ any type of display form in which numbers and the like can be displayed to a user, in addition to the illustrated graduations.

A pair of optical fiber holders 20 are disposed on the left and right sides of the upper frame 10 and the upper surface of the rear side of the lower frame 12. A through hole 200 is formed in the substantially central portion of each of the optical fiber holders 20, and an optical fiber F is inserted through the through hole 200. Although it is preferable that the diameter of the through hole is 250 μm, the present invention is not inevitably limited thereto.

The optical fiber holder 20 may be erected as illustrated by the arrow. When the optical fiber holder 20 is erected, the optical fiber F is inserted through the gap between the upper frame 10 and the lower frame 12, and the portion of an optical fiber F where gratings need to be generated is located on a spring S. Thereafter, the optical fiber holder 20 is laid down and fastens the optical fiber F.

Figure 5:
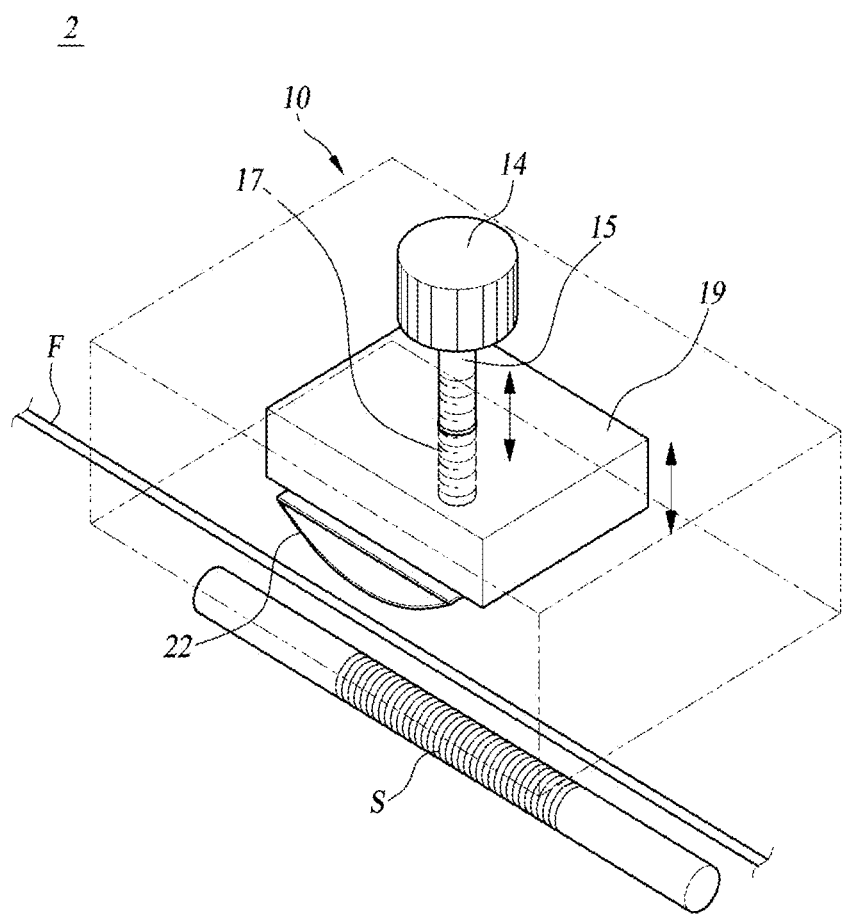
FIG. 5 is a partially perspective view illustrating an intensity adjusting unit with a lower frame removed from the apparatus according to the embodiment of the present invention illustrated in FIG. 4.

FIG. 5 is a sectional view of the interior of the upper frame 10 illustrating the intensity adjusting unit 2 according to the present invention. The intensity adjusting unit 2 is adapted to adjust a mode coupling intensity constant by applying pressing force to the optical fiber F, and includes an intensity adjusting knob 14, a screw 15 extending downward from the center of a lower surface of the intensity adjusting knob 14, a square holder 19 having a threaded recess 17 configured to accommodate the screw 15, and a press part 22 fixedly attached to a lower surface of the holder 19.

When an operator rotates the intensity adjusting knob 14 in one direction, the screw 15 is rotated while being engaged with the thread of the recess 17 such that the linear location of the holder 19 is changed upward or downward. Accordingly, the linear location of the press part 22 operatively integrated with the holder 19 is also changed upward or downward such that the press part 22 comes into contact with the optical fiber F to apply suitable pressing force. It is preferable that the press part 22 is a plate spring whose lower surface is convex, for example, as illustrated in the drawing. When the plate spring comes into contact with the optical fiber F and force is applied to the plate spring while, the lower surface of the plate spring gradually becomes widened in a flat form, and thus the plate spring applies force to the overall optical fiber F.

Since the optical fiber F faces or is in contact with the spring S that is installed in a spring guide 50 and configured to generate gratings as will be described below, the optical fiber F is pressed by the spring S due to the force applied by the press part 22, and thus gratings are formed on the outer surface of the optical fiber F at the interval between the turns of the spring S, that is, the period of the pitch of the spring S. Since the material properties of the gratings, such as the radius of curvature, depend on the force applied while the optical fiber F faces the spring S, an optimum value suitable for the coupling mode of the optical fiber F may be obtained while a mode coupling constant is being varied according to the amount of rotation of the dial-type intensity adjusting knob 14.

Although it is desirable to implement the press part as a plate spring in terms of a long-period grating experiment or an operation and this is theoretically preferable in that the center of the optical fiber F receives the largest pressure and the pressure becomes weaker at the opposite ends of the optical fiber F, that is, pressure forms a Gaussian shape, the optical fiber F may be formed of a firm material, for example, acryl, and also may employ a flat shape instead of a convex shape.

The Gaussian shape exhibits a maximum amplitude change in the refractive index of the core at the center of the core and a minimum change at opposite ends of the core, whereas a uniform positive-only index change related to the application of uniform force to the overall core using a flat shape at the same time has a characteristic in which the center and opposite ends of the core undergo the same change in the amplitude of refractive index. It may be considered that the former is a further improved one.

The optical fiber F interposed between the press part 22 and the spring S has minute bends, that is, gratings, along the coil of the spring S. The radii of curvature of the gratings formed in the optical fiber may be adjusted according to the magnitude of the pressing force. The intensity of the gratings that means the degree of bending of the optical fiber may be represented by the radius of curvature of the bent optical fiber. The minimum radius of curvature of the gratings is the same as the diameter of the spring, and the maximum radius of curvature of the gratings is infinite when the optical fiber is completely spread out. When a spring having a diameter of 300 μm is used, the radius of curvature of the bent optical fiber may range from 150 μm to the infinity.

Meanwhile, when the pressing force of the press part 22 is removed, the gratings generated in the optical fiber may be removed by the resiliency of the optical fiber.

Figure 6:
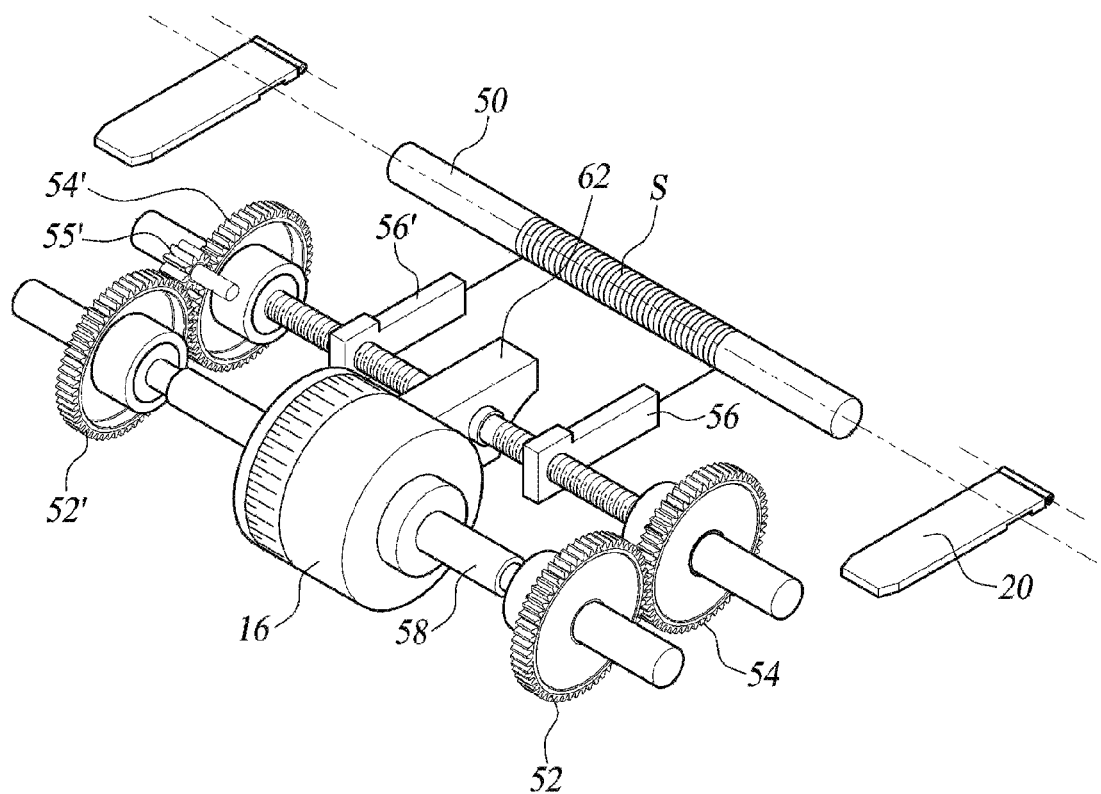
FIG. 6 is a partially perspective view illustrating a period adjusting unit of the present invention with an upper frame removed from the apparatus according to the embodiment of the present invention illustrated in FIG. 4.

FIG. 6 is a perspective view of the interior of the lower frame 12 illustrating a period adjusting unit 3 according to the present invention. The period adjusting unit 3 includes a grating generating unit, and a period adjusting mechanism.

In an embodiment of the present invention, the spring S may be employed as the grating generating unit.

The spring S is wound around the center of the cylindrical spring guide 50 that extends between the left and right surfaces of the lower frame 12. It may be understood that the period of the gratings of the optical fiber F coincides with the intervals between the turns of the spring S. Accordingly, when the intervals between the turns of the spring S are uniformly increased, the period of the gratings increases. In contrast, when the intervals are uniformly decreased, the period of the gratings decreases. The spring is a coil spring, and is made of stainless steel. It is preferable that the spring is designed by taking into account the thickness, treatment method, and angles and locations of the opposite ends of the spring so that the gratings are uniform.

According to experiments conducted by the present inventor, accurate gratings could be generated in an optical fiber when the outer diameter of the spring was 300 μm, the number of turns was 51 (that is, the number of the gratings is 50), and the overall length of the optical fiber ranged from 1.5 to 4.5 cm, that is, when the intervals between the gratings ranged from 300 (=1.5 cm/50) to 900 μm (=4.5 cm/50). However, the suitable range of the intervals of the spring is not limited thereto. The period interval may be selected from the range of 200 μm to 1500 μm according to the size of the spring. Various modifications may be made to realize various wavelengths and couplings between modes in various optical fibers. That is, the overall length of the spring may be maximally increased, and the outer diameter of the spring may be reduced and the number of turns may be increased.

As illustrated in FIG. 6, the period adjusting mechanism according to the present invention is a mechanism configured to adjust the interval of the spring S, and may include a mechanical power transmission unit including a period adjusting knob 16, a pair of first row gears 52 and 52', a pair of second row gears 54 and 54', an auxiliary gear 55', and nuts 56 and 56'.

The first row gears 52 and 52' are coaxial with the period adjusting knob 16, and are disposed on the left and right sides of the period adjusting knob 16 at an equal interval through a first shaft 58. The right second row gear 54 is fitted around a second shaft 60 while being engaged with the first row gear 52 located below the right second row gear 54. Meanwhile, the left second row gear 54' installed around a third shaft 60' to be coaxial with the second row gear 54 is engaged with the auxiliary gear 55' having a small diameter, and the auxiliary gear 55' is engaged with the left first row gear 52' located below the auxiliary gear 55'. Accordingly, when the period adjusting knob 16 is rotated clockwise, the second row gears 54 and 54' are rotated in opposite directions, that is, counterclockwise and clockwise, respectively. In this case, the period adjusting knob 16 acts as a driving source, the first row gears act as driving gears, and the second row gears act as driven gears.

That is, the period adjusting mechanism may be any type of mechanism that includes a period adjusting controller, a power generating unit configured to provide power for changing the length of the grating generating unit under the control of the period adjusting controller, and a grating period determination unit connected to at least one end of the grating generating unit and configured such that the location of the grating period determination unit is changed by the power generating unit to change the length of the grating generating unit.

Accordingly, it will be apparent that the power generating unit may be an electric motor and may include an electric motor and a pinion, and the grating period determination unit configured to transmit power may be variously replaced with a hydraulic- or piston-type apparatus configured to generate the variable displacement of the spring.

Figure 7:
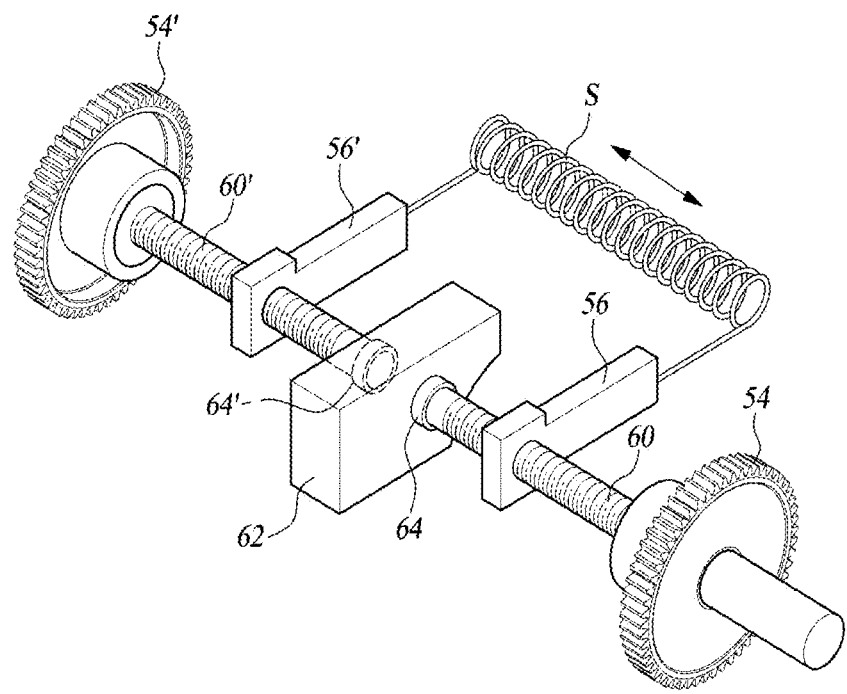
FIG. 7 is a partially perspective view illustrating the period adjusting unit configured to vary a spring according to the embodiment of the present invention illustrated in FIG. 6.

As illustrated in FIG. 7 in more detail, a housing 62 is installed to face the period adjusting knob 16, and second and third shafts 60 and 60' are installed on the left and right sides of the housing 62. It is preferable that the second and third shafts 60 and 60' are, for example, feeding screws having threads. Hub/bearing assemblies 64 and 64' are installed on opposite sides of the housing 62, and accommodate the second and third shafts 60 and 60'.

As described above, the second row gear 54 and the second row gear 54' are rotated in opposite directions. Accordingly, for example, when the second row gear 54 is rotated clockwise, the nut 56 connected to the second row gear 54 is moved leftward along the second shaft 60. Meanwhile, the second row gear 54' is rotated counterclockwise, and thus the nut 56' connected to the second row gear 54' is moved leftward along the third shaft 60'. That is, the nuts 56 and 56' are always moved away from each other or close to each other. In a chained fashion, the opposite ends of the spring S connected to the nuts 56 and 56' becomes away from each other or close to each other. Since the length of the spring is extended by the moved distance, the pitches between the turns are uniformly increased or decreased, so that the period of the gratings applied to the optical fiber is adjusted. Accordingly, the nuts 56 and 56' act as a grating period determination unit that forms the period of the gratings.

It is preferable that the period of the gratings adjusted by the grating period determination unit coincide with the beat length of two modes that are desired to be coupled to each other in the optical fiber.

In the above-described example, if the shaft is a feeding screw, the nuts 56 and 56' are moved forward or rearward by the lead of the screw with respect to each rotation of the second row gears 54 and 54', and then an accurate period value can be adjusted by setting the period interval profile of the extending or contracting spring.

Although the period adjusting mechanism is described as including a pair of first row gears 52 and 52', a pair of second row gears 54 and 54', an auxiliary gear 55' and nuts 56 and 56' to adjust the interval of the spring S that acts as a grating generating unit, a structure for changing the period of the spring by fixing one end of the spring S, that is, a grating generating unit, and moving an opposite end of the spring using one gear and one nut may be employed.

According to the experiments conducted by the present inventor, under the value condition of the above-mentioned spring, when adjustment was made such that the overall length of the spring was increased by 600 μm with respect to each rotation of the period adjusting knob 16, the period was increased by 12 μm (=600 μm/50), and the overall length of the spring was changed within a range of approximately 3 cm, an excellent effect could be obtained. However, since these experiments are basic experiments conducted on the assumption that the operation thereof is manually performed, it should be understood that various optimum combinations may be obtained according to materials, properties and operation methods of components.

In the present invention, the second and third shafts 60 and 60' and the hub/bearing assemblies 64 and 64' may be modified into any mechanism that can selectively extend and contact the spring S leftward and rightward. For example, they may be replaced with a spline/bearing structure.

Although the present invention employs a two-layer structure including the first row gears and the second row gears, the overall structure of the double-layered structure may be modified. For example, it may be modified into a single-layer structure employing a motor-pinion structure and coaxial shafts.

According to the above-described embodiment of the present invention, the mode coupling intensity constant or perturbation period may be fixed and the remaining parameters may be adjusted by simultaneously adjust the intensity adjusting unit 2 and the period adjusting unit 3 and thus simultaneously changing both the mode coupling intensity constant and the perturbation period or by changing only one of the intensity adjusting unit 2 and the period adjusting unit 3 based on the principle of adjusting the mode coupling intensity constant and the perturbation period. Accordingly, an optimum condition for the coupling between the modes of the optical fiber F can be obtained under various conditions.

The apparatus 1 for producing an optical fiber having adjustable long-period gratings can generate various types of grating periods in an optical fiber, for example, through an automatic process of rotating corresponding knobs according to an intensity and a period input to a computer while the optical fiber F is being continuously fed in a row, as well as in a single portion of the optical fiber F.

The present invention has the following advantages. However, these advantages of the present invention are listed only in a limited way, and thus it will apparent that the advantages of the present invention are not limited thereto.

First, according to the present invention, since an apparatus including compact and firm components is used and an optical fiber is pressed by force varying in steps after being fixed, long-period gratings can be obtain with minimum damage.

Second, according to the present invention, the conversion between modes can be achieved with minimum loss of light that propagates through an optical fiber.

Third, according to the present invention, gratings can be applied to an optical fiber while a perturbation period is being arbitrarily changed in such a way as to freely adjust the intervals between long-period gratings applied to the optical fiber.

Fourth, according to the present invention, since gratings can be applied to a necessary portion of an optical fiber in a simple method, a coupled mode can be variously changed at any time.

The present invention relates to an apparatus for generating adjustable long-period gratings and can be utilized in various industrial fields, such as the fields of electronic communications, networks, medical instruments, and lighting.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An apparatus for generating long-period gratings in an optical fiber, the apparatus comprising:
   an intensity adjusting unit configured to adjust a radius of curvature of gratings generated in an optical fiber; and
   a period adjusting unit configured to adjust a period of the gratings generated in the optical fiber,
   wherein the period adjusting unit comprises:
   a grating generating unit configured to generate the gratings in the optical fiber; and
   a period adjusting mechanism configured to selectively increase and decrease a length of the grating generating unit,
   wherein the period adjusting mechanism comprises:
   a period adjusting knob configured to be rotatable;
   a pair of driven gears operatively connected to the period adjusting knob, and configured to be rotated in opposite directions; and
   a grating period determination unit connected to opposite ends of the grating generating unit, and configured such that a location of the grating period determination unit is changed through rotation of the pair of driven gears to change a length of the grating generating unit.

2. The apparatus of claim 1, wherein the period adjusting mechanism comprises:
   a period adjusting controller;
   a power generating unit configured to provide power for changing a length of the grating generating unit under the control of the period adjusting controller; and
   a grating period determination unit connected to at least one end of the grating generating unit, and configured to change a length of the grating generating unit by varying a location of the grating period determination unit using the power generating unit.

3. The apparatus of claim 2, wherein the power generating unit is an electric motor.

4. The apparatus of claim 2, wherein the grating generating unit comprises joints having a period, and the period ranges from 300 μm to 900 μm.

5. The apparatus of claim 1, wherein the period adjusting mechanism further comprises a pair of driving gears installed on a shaft connected to the period adjusting knob, and wherein one of the pair of driving gears is engaged with one of the pair of driven gears and the other driving gear is operatively connected to a remaining driven gear via an auxiliary gear.

6. The apparatus of claim 1, wherein the grating generating unit is a spring.

7. The apparatus of claim 1, wherein the grating generating unit comprises joints having a period, and the period ranges from 300 μm to 900 μm.

8. The apparatus of claim 1, wherein the intensity adjusting unit comprises:
   an intensity adjusting knob;
   an extension member configured to extend from the intensity adjusting knob;
   a holder configured to accommodate the extension member and change a linear location of the extension member as the extension member rotates; and
   a press part coupled to the holder, and configured to press the optical fiber along with the grating generating unit by changing a linear location thereof.

9. The apparatus of claim 8, wherein the press part is a plate spring.

10. The apparatus of claim 8, wherein the press part has a Gaussian distribution shape.

11. The apparatus of claim 1, wherein a radius of curvature of the gratings generated in the optical fiber is equal to or larger than 150 μm.

12. An apparatus for generating long-period gratings in an optical fiber, the apparatus comprising:
    an intensity adjusting unit configured to adjust a radius of curvature of gratings generated in an optical fiber; and
    a period adjusting unit configured to adjust a period of the gratings generated in the optical fiber,
    wherein the period adjusting unit comprises:
    a grating generating unit configured to generate the gratings in the optical fiber; and
    a period adjusting mechanism configured to selectively increase and decrease a length of the grating generating unit,
    wherein the period adjusting mechanism comprises:
    a period adjusting knob configured to be rotatable;
    a driven gear operatively connected to the period adjusting knob to be rotated; and
    a grating period determination unit connected to at least one end of the grating generating unit, and configured to change a length of the grating generating unit by fixing one end of the grating period determination unit and varying a location of the grating period determination unit to change a length of the grating generating unit.

13. The apparatus of claim 12, wherein the grating generating unit is a spring.

14. The apparatus of claim 5, wherein the grating generating unit comprises joints having a period, and the period ranges from 300 μm to 900 μm.

15. The apparatus of claim 5, wherein the grating generating unit is a spring.

16. The apparatus of claim 12, wherein the grating generating unit comprises joints having a period, and the period ranges from 300 μm to 900 μm.

* * * * *